(12) United States Patent
Madl et al.

(10) Patent No.: US 6,513,071 B2
(45) Date of Patent: Jan. 28, 2003

(54) METHOD FOR PROVIDING KIOSK FUNCTIONALITY IN A GENERAL PURPOSE OPERATING SYSTEM

(75) Inventors: Michael Thomas Madl, Woodstock, GA (US); William Philip Shaouy, Marietta, GA (US); Marcus Frederick Nucci, Charlottesville, VA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/133,520

(22) Filed: Aug. 13, 1998

(65) Prior Publication Data

US 2002/0091870 A1 Jul. 11, 2002

(51) Int. Cl.[7] .................................................. G06F 9/54
(52) U.S. Cl. ........................... 709/313; 713/502; 713/2; 709/318
(58) Field of Search ................................. 709/204, 205, 709/310–332, 223; 710/6, 73, 260–269; 702/187; 345/781; 717/4; 711/154; 713/502, 2

(56) References Cited

U.S. PATENT DOCUMENTS

| 5,056,057 A | * | 10/1991 | Johnson et al. ............... 710/73 |
| 5,371,871 A | * | 12/1994 | Spilo ........................... 711/154 |
| 5,537,548 A | * | 7/1996 | Fin et al. ..................... 709/204 |
| 5,680,620 A | * | 10/1997 | Ross ............................. 717/4 |
| 5,799,206 A | * | 8/1998 | Kitagawa et al. ............. 710/36 |
| 5,909,215 A | * | 6/1999 | Berstis et al. ................ 345/781 |
| 6,047,314 A | * | 4/2000 | Pommier et al. ........... 709/205 |
| 6,115,680 A | * | 9/2000 | Coffee et al. ............... 702/187 |
| 6,125,390 A | * | 9/2000 | Touboul ...................... 709/223 |
| 6,216,177 B1 | * | 4/2001 | Mairs et al. .................... 710/6 |

OTHER PUBLICATIONS

Pietrek, Matt, Learn System–Level Win32 Coding Techniques by Writing an API Spy Program, Microsoft Systems Journal, Dec. 1994, pp(26).*

(no author given) "Coherent", Mark Williams Company, pp. 784–785, 1991.*

* cited by examiner

Primary Examiner—St. John Courtenay, III
(74) Attorney, Agent, or Firm—Fleit, Kain, Gibbons, Gutman & Bongini P.L.; Jon A. Gibbons

(57) ABSTRACT

A method to intercept operating system messages in an informational processing device, the method comprising the steps of: waiting for an operating system message; determining if the message corresponds to a previously selected operating system message; and performing an operating system call that has been previously mapped to the selected operating system message.

24 Claims, 9 Drawing Sheets

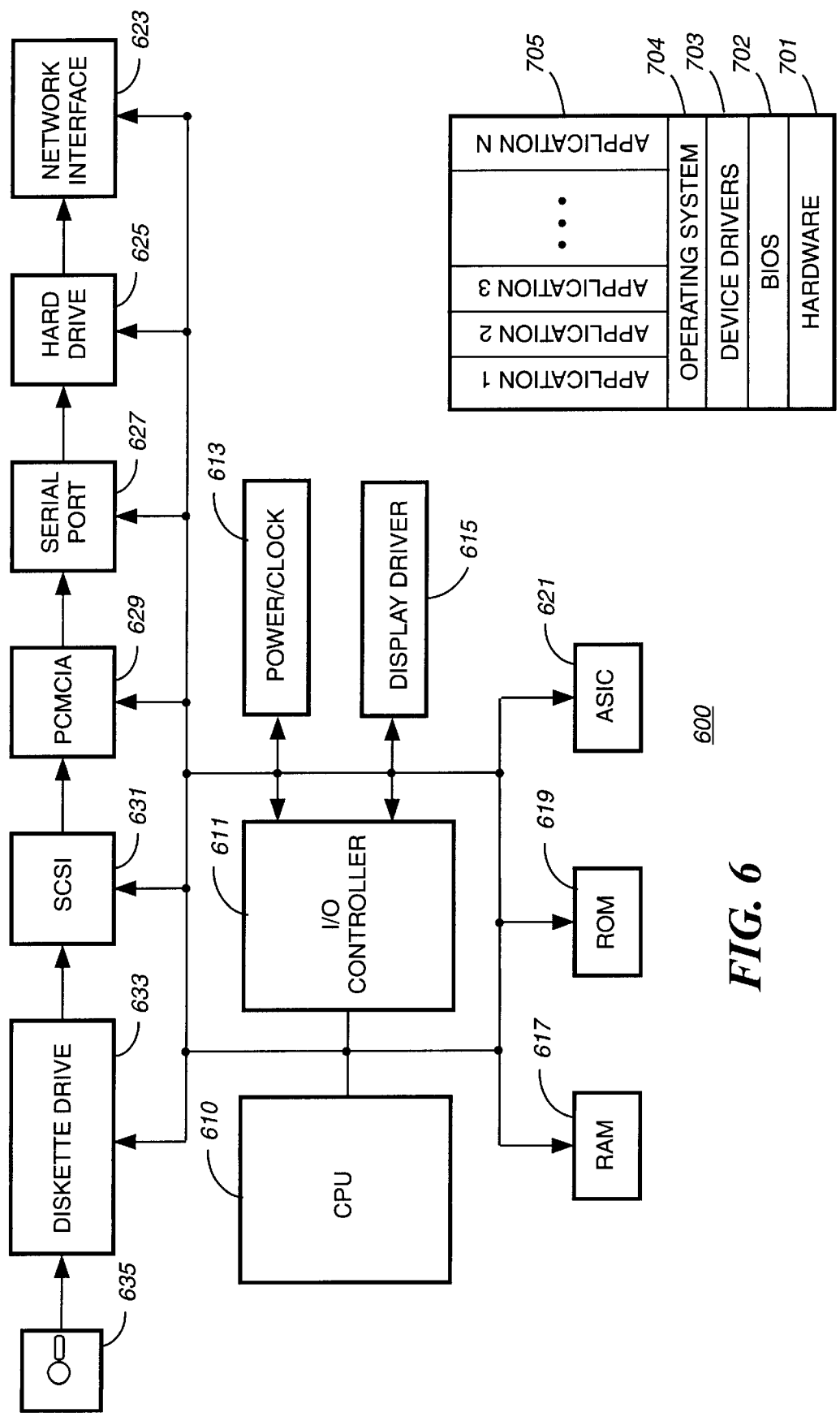

A SYSTEM ERROR HAS OCCURRED, PLEASE SHUTDOWN THE APPLICATION.

*FIG. 10*

METHOD FOR PROVIDING KIOSK FUNCTIONALITY IN A GENERAL PURPOSE OPERATING SYSTEM

CROSS-REFERENCE TO RELATED APPLICATIONS

Not applicable

BACKGROUND OF THE INVENTION

1. Field of the Invention

This invention relates generally to the field of retail kiosks devices for providing information, goods and services to end-users. And more particularly, this present invention relates to the field of operating system functionality for kiosks.

2. Description of the Related Art

The use of kiosks to give end-users access to information, goods and services continues to grow. Kiosks can be standalone machines for distributing goods, such as, vending machines and informational centers that are typically found in major airports, automobile rental centers and shopping malls. Unattended multimedia kiosks dispense public information via computer screens. An end-user enters selections using a keypad, a touch screen or both. For example, a user at an automobile rental center, may select directions to a hotel and push a button to print a map.

A kiosk is usually a self-standing structure such as a newsstand or ticket booth. A kiosk is typically built around a microprocessor-based system such as a PC. The providers of Kiosks often use standard PC hardware, software and operating systems to reduce the cost of customization and reduce the need for custom software development tools. An example PC platform comprises and Intel compatible PC running Microsoft Windows or equivalent. Other kiosk hardware platforms used include PowerPC, RISC, and Alpha that run operating systems such as Windows 98/NT, OS/2, Unix and equivalents.

Another type of kiosk is a network kiosk. One of the more familiar network kiosks is an Automatic Teller Machine (ATM) that provides financial transactions to end-users. The networked kiosks, like the standalone kiosks, are designed around microprocessor-based systems in general, and more particularly based upon PCS. A more recent trend is to design network kiosks on thin-clients where the server on the network delivers to each kiosk on the network the applications, the data and even the operating system for the kiosk to run. Examples of network thin-client devices include NetPC, Java Terminals, set-top boxes and Internet Clients. Several retailers are setting up Intranet kiosks for use as informational kiosks, customer survey kiosk and point of sale terminals.

The use of standard hardware platforms and software platforms while lowering costs of the deployment of kiosks is not without its short comings. One short coming, when using standard applications such as HTML (Hyper Text Markup Language) compatible browsers are the presence of graphical artifacts. The display of HTML documents in standard browsers including Mosaic, Netscape Navigator and Microsoft Internet Explorer includes such items as title bars, elevator bars, window resizing icons and more. Referring to FIG. 1, there is shown a screen capture of a Web browser displaying the home page of the USPTO with the graphical artifacts 100. The specific graphical artifacts shown are the navigation tool bar 101 and location bar 102. These graphical elements are the result or artifacts of using commercially available HTML-compatible browsers for a kiosk application and these graphical artifacts are not desirable when presenting an end-user of a kiosk information. The providers of kiosks strive to maximize the available viewable area on a computer display without sacrificing any of the computer display area to these undesirable graphical artifacts that are common to popular HTML-compatible browsers.

Some providers of HTML-compatible browsers have enabled users to remove some of these graphical artifacts such as the browser menu, title bar, location indicator and toolbar, to allow the graphics to occupy a full screen. One example of a such a HTML-compatible browser is Netscape Communicator 4.0. FIG. 2 is a screen capture of Netscape Communicator 4.x with some of the graphical artifacts of FIG. 1 removed. However, there are still features of many operating systems, including Windows 3.1, 95, 98 and NT that present graphical information to users that is undesirable to the providers of kiosks who often strive to remove this information. One example of an undesirable graphical information is the status box of an operating system. These status boxes are also called dialog boxes, that "pops-up" to the foreground of the display information in response to a system event. A popular example of a status box is a print confirmation box 301 that appears when requesting a HTML-compatible browser to print a screen, as shown in FIG. 3. The end-user selecting a print button 103 with a keyboard and mouse is presented the print confirmation box 301. The display of this print confirmation box 301 detracts from the experience the kiosk provider is seeking. Therefore, a need exists to enable providers of kiosks a method to use commercially available operating systems and HTML-compatible browsers, without the display of dialog boxes or confirmation boxes from the operating system. Moreover, in many kiosk system deployments, the kiosk application is always forced to the foreground of the display screen, this causes any confirmation box requiring end-user confirmation, e.g., selecting the "OK" or "Cancel" buttons, to be masked. Accordingly a need exists to overcome this problem.

Another short coming providers of kiosks face when using commercially available PC hardware and operating system is the occurrence of a system "crash" or the system "locking-up" and "freezing". The use of a Reset Button or an On/Off Switch accessible to an end-user is undesirable in a kiosk environment. Therefore, a need exists to enable providers of kiosks a method to automatically recover from a system crash.

Still, another short coming providers of kiosks face when using commercially available PC hardware and operating system software is the inability to disable operating system responses to certain keyboard key combinations. Examples of undesirable operating system responses to keyboard key combinations include: re-booting by simultaneously depressing ctrl-Alt-Del keys as shown in FIG. 4; Start-Button display Ctrl-Esc keys on Windows 95, 98 or NT as shown in FIG. 5. These system responses to key combinations or mouse selections are undesirable and can detract from the kiosk environment itself. Kiosk providers do not want end-users performing operating system requests. Accordingly, a need exists to provide a method to disable responses to operating system level commands from end-users when using commercially available operating systems in a kiosk environment.

SUMMARY OF THE INVENTION

Briefly, in accordance with the present invention, disclosed is a method to intercept operating system messages in an informational processing device, the method comprising the steps of: waiting for an operating system message; determining if the message corresponds to a previously selected operating system message; and performing an operating system call that has been previously mapped to the selected operating system message.

BRIEF DESCRIPTION OF THE DRAWINGS

FIG. 6 is a block diagram of the major electrical components of an information processing device for a kiosk according to the present invention.

FIG. 7 is a block diagram illustrating the software hierarchy for the information processing device of FIG. 6 according to the present invention.

FIG. 10 is an example of an operating system status box for a system error dialog box according to the present invention.

DETAILED DESCRIPTION OF AN EMBODIMENT

Figure 1:
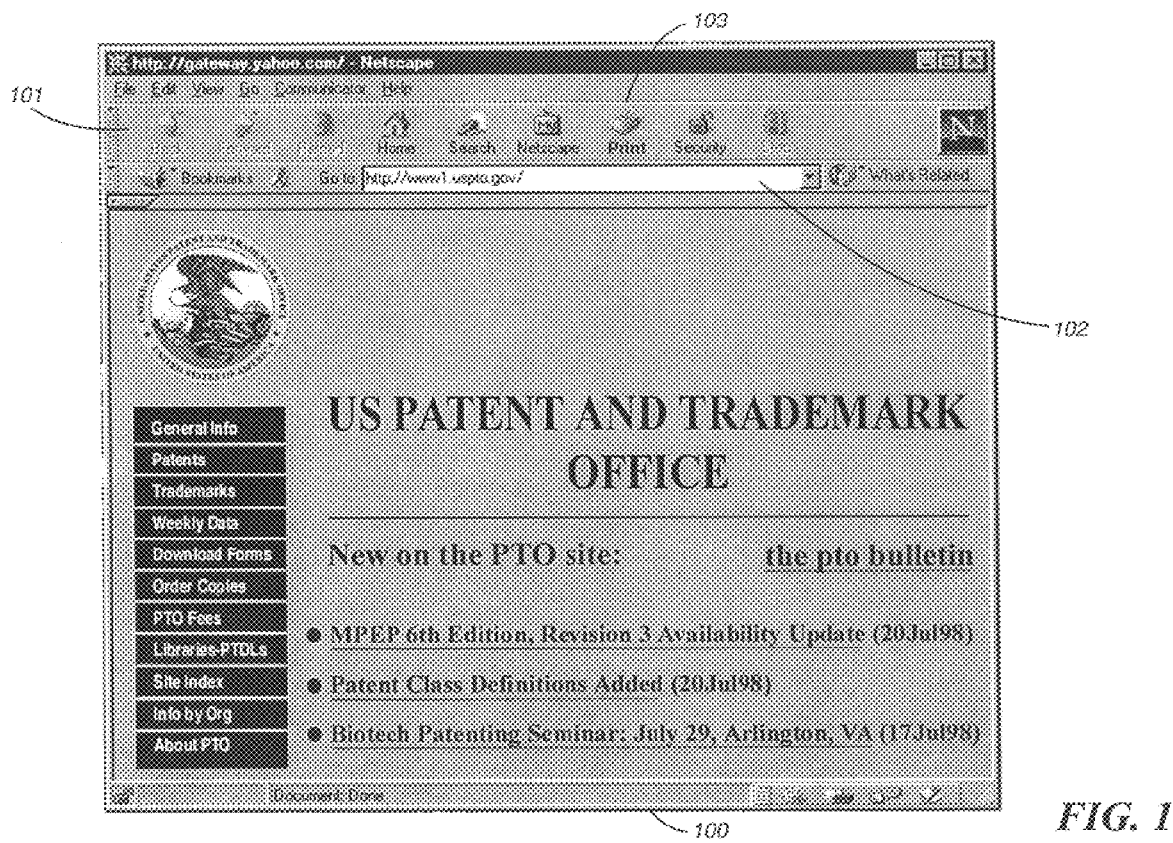
FIG. 1 is a screen capture of a HTML-compatible browser displaying the home page of the USPTO with graphical artifacts.
Figure 2:
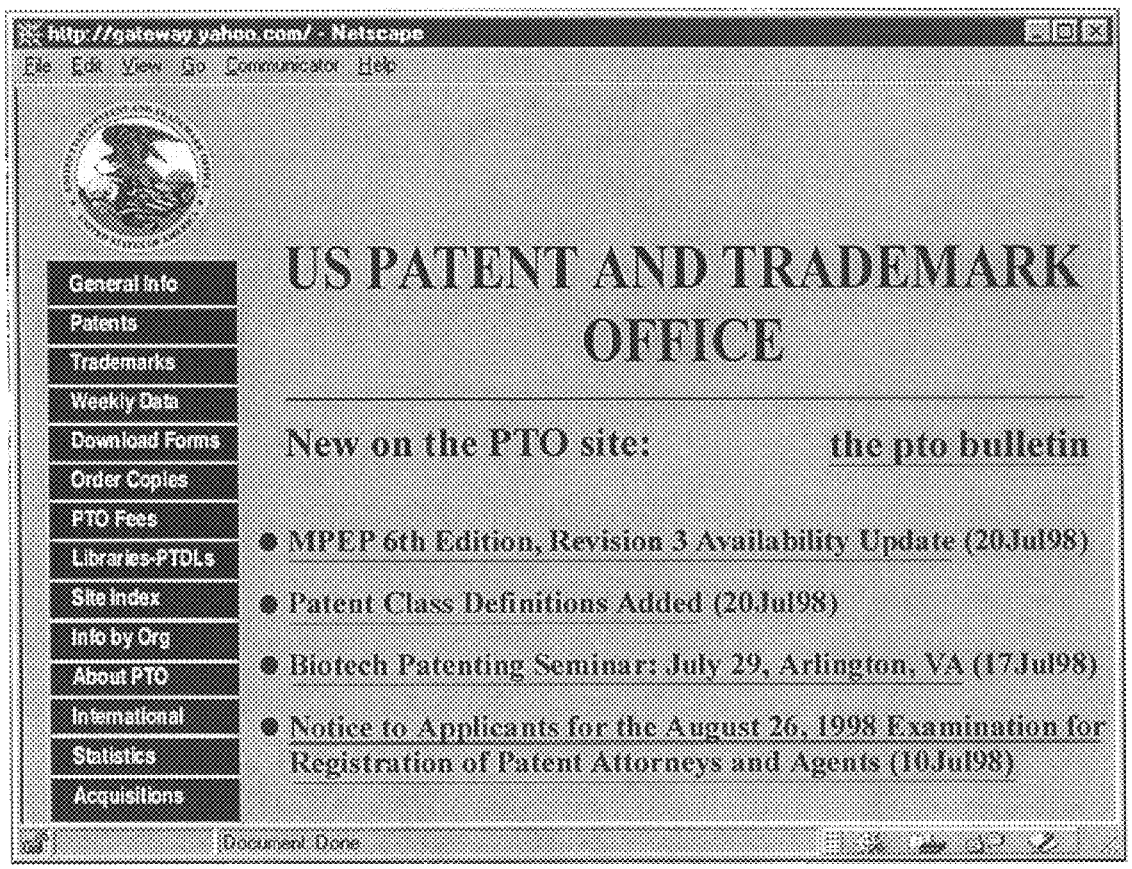
FIG. 2 is a screen capture of Netscape Communicator 4.x with some of the graphical artifacts of FIG. 1 removed.

Referring to FIG. 6, there is shown a block diagram of the major electrical components of an information processing device 600 for a kiosk in accordance with this invention. The electrical components include: a central processing unit (CPU) 610, an Input/Output (I/O) Controller 611, a system power and clock source 613; display driver 615; RAM 617; ROM 619; ASIC (application specific integrated circuit) 621 and a hard disk drive 625. These are representative components of a computer. The operation of a computer comprising these elements is well understood. Network interface 623 provides connection to a computer network such as Ethernet, TCP/IP or other popular protocol network interfaces. Optional components for interfacing to external peripherals include: a Small Computer Systems Interface (SCSI) port 631 for attaching peripherals; a PCMCIA slot 629; and serial port 627. An optional diskette drive 633 is shown for loading or saving code to removable diskettes 635. The system 600 may be implemented by combination of hardware and software. Moreover, the functionality required for using the invention may be embodied in computer-readable media (such as 3.5 inch diskette 635) to be used in programming an information-processing apparatus (e.g., a personal computer) to perform in accordance with the invention.

FIG. 7 is a block diagram illustrating the software hierarchy of for the information processing device of FIG. 6 according to the present invention. The hardware 701 is the information processing device of FIG. 6. BIOS (Basic Input Output System) 702 is a set of low level of computer hardware instructions for communications between an operating system 704, device driver 703 and hardware 701. Device drivers 703 are hardware specific code used to communicate between and operating system 704 and hardware peripherals such as a CD ROM drive or printer. Applications 705 are software applications written in C/C++, assembler or equivalent. Operating system 794 is the master program that loads after BIOS 702 initializes that controls and runs the hardware 701. Examples of operating systems include Windows 3.1/95/98/NT, Unix, Macintosh, OS/2 and equivalent.

Figure 8:
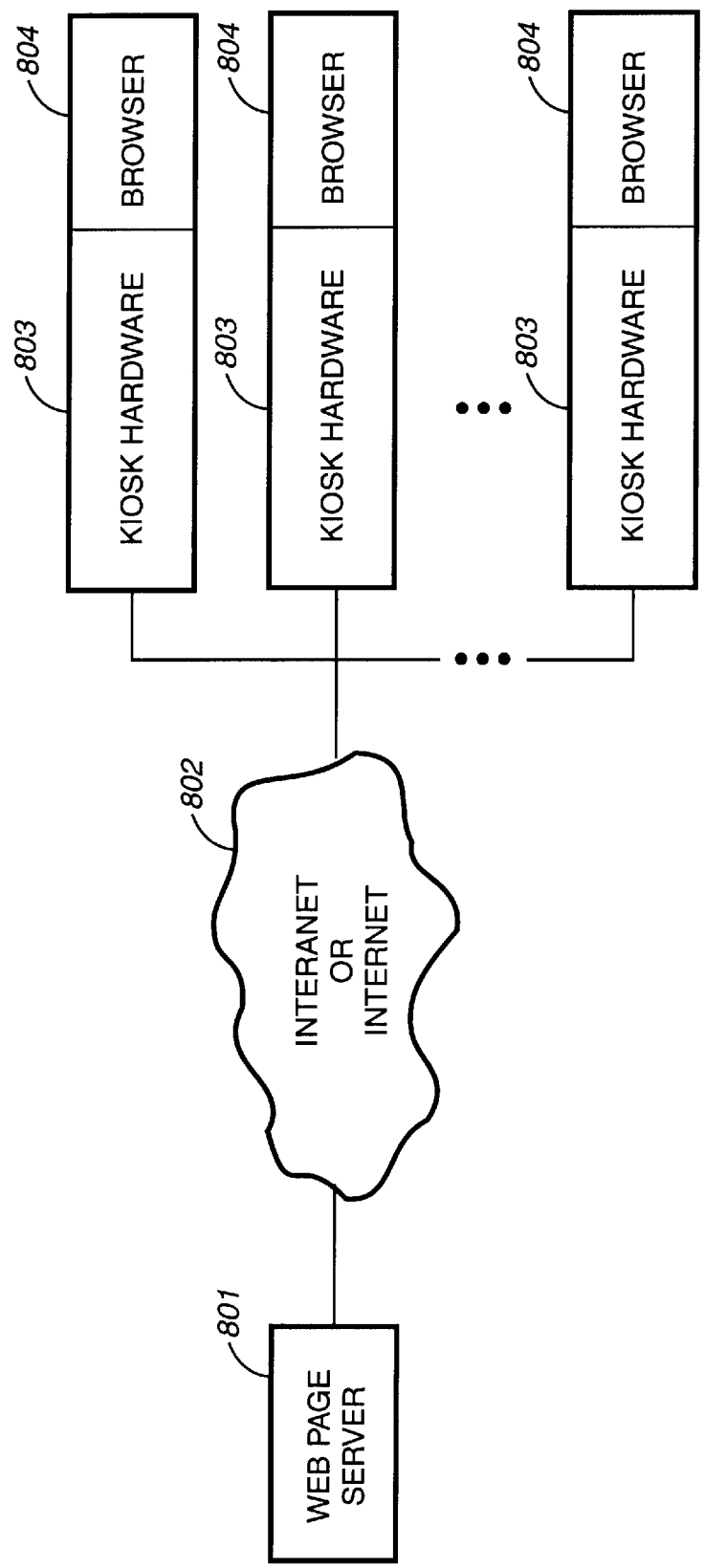
FIG. 8 is a block diagram of the major components of an Internet/Intranet system for a Kiosk device according to the present invention.

FIG. 8 is a functional block diagram depicting a computer data network 800. The system includes a HTML-compatible page server 801 according to the present invention. HTML-compatible page server 801 is connected via an Internet or Internet connections 802 to one or more kiosk clients 803 running a HTML-compatible browser application 804. HTML-compatible browser 804 comprises client software programs based upon an HTTP (Hyper-Text-Transfer-Protocol) compatible product such as Netscape Navigator, Sun Hot JAVA Browser or Microsoft Internet Explorer. It is important to point out that the precise operating systems and hardware configurations of HTML-compatible server 801, and HTML-compatible-browser 804 are not limited to any specific hardware or software configuration. Kiosk client 803 can be an information processing device, as described in FIG. 6 above or any other information processing apparatus suitable for communicating with the Web.

Figure 9:
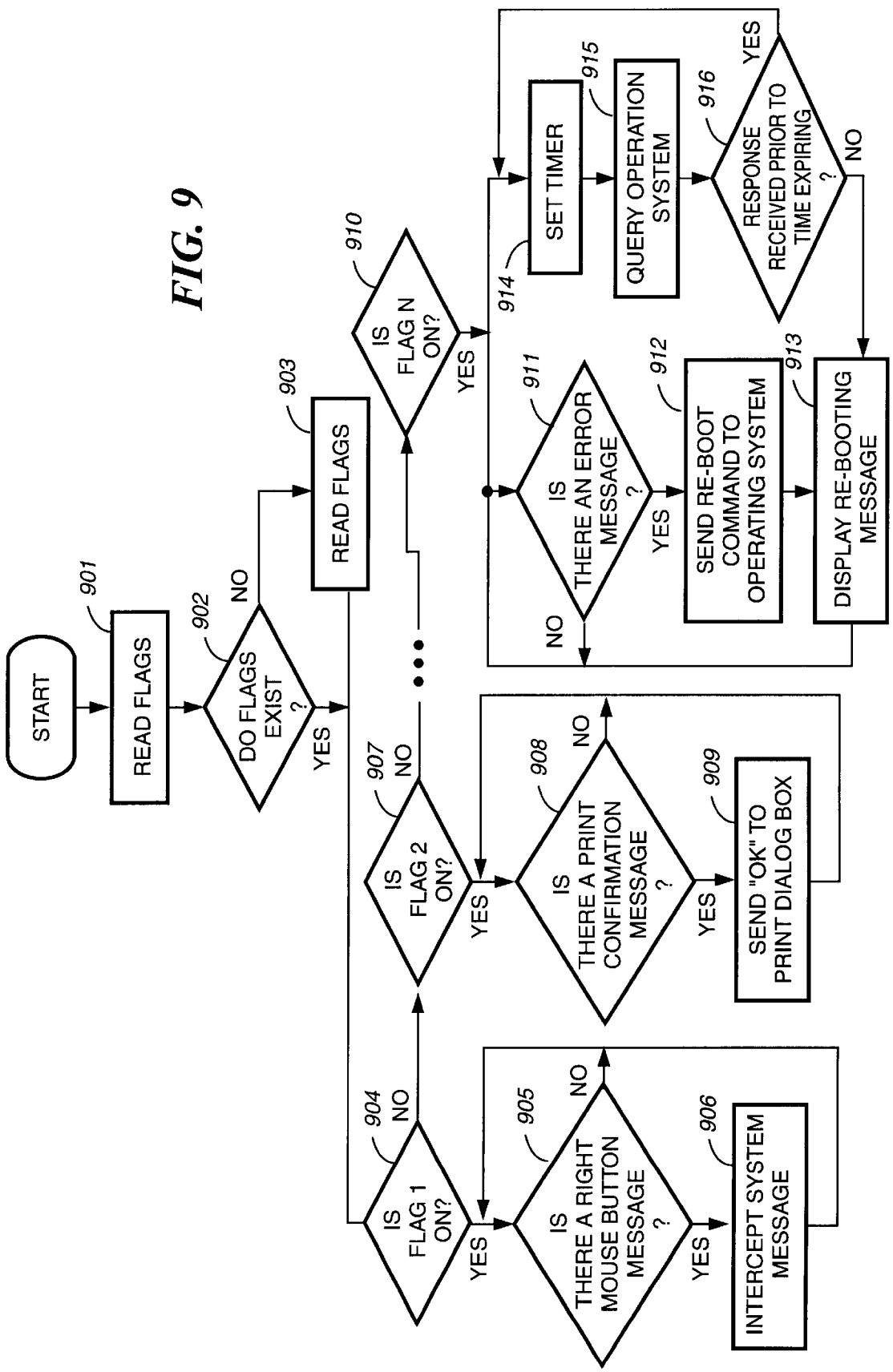
FIG. 9 is a flow diagram for intercepting operating system messages according to the present invention.

FIG. 9 is a flow diagram of an application for intercepting operating system messages according to the present invention. The software application 705 can be written in any of a variety of available programming languages including Assembler, C/C++ or equivalent running on operating system 704. The application 705 in the preferred embodiment is a daemon program. A daemon program is a program that executes in the background ready to preform an operation when required. It is usually an unattended process initiated at operating system startup. The application 705 starts by reading a series of initialization parameters such as flags passed via command line parameters or through initialization files or .INI files, step 901. If there are no initialization parameters passed, step 902, previously defined default parameters are used, step 903. Example parameters flags included: disabling the left mouse button; disabling the right mouse button; disabling the print confirmation box; disabling system reboot; disabling Ctrl-Alt-Del key combinations; disabling Ctrl-Esc key combinations and others.

If a parameter disabling the right mouse button is set, a right mouse button disabling routine is loaded, step 904. The application 705 waits for a message from operating system 704 that the right mouse button has been depressed, step 905. The application 705 will wait until an operating system message has been intercepted. Once an operating system message indicating that a right mouse button has been depressed. The method of intercepting an operating system message is known as a hook. A hook is a program function that can intercept an operating system message before this message is sent to a target application or target window. It should be understood that the target window could be part of the operating system itself such as the user-shell. In Window's 95/98/NT this is called the Window's desktop. In this embodiment, the operating system message after being intercepted is not passed to the target application or target window, step 906. Once a right mouse button is intercepted in step 906, the system waits for the next system operating system message indicating an end-user depressed the right mouse button on a mouse or touch screen.

Figure 3:
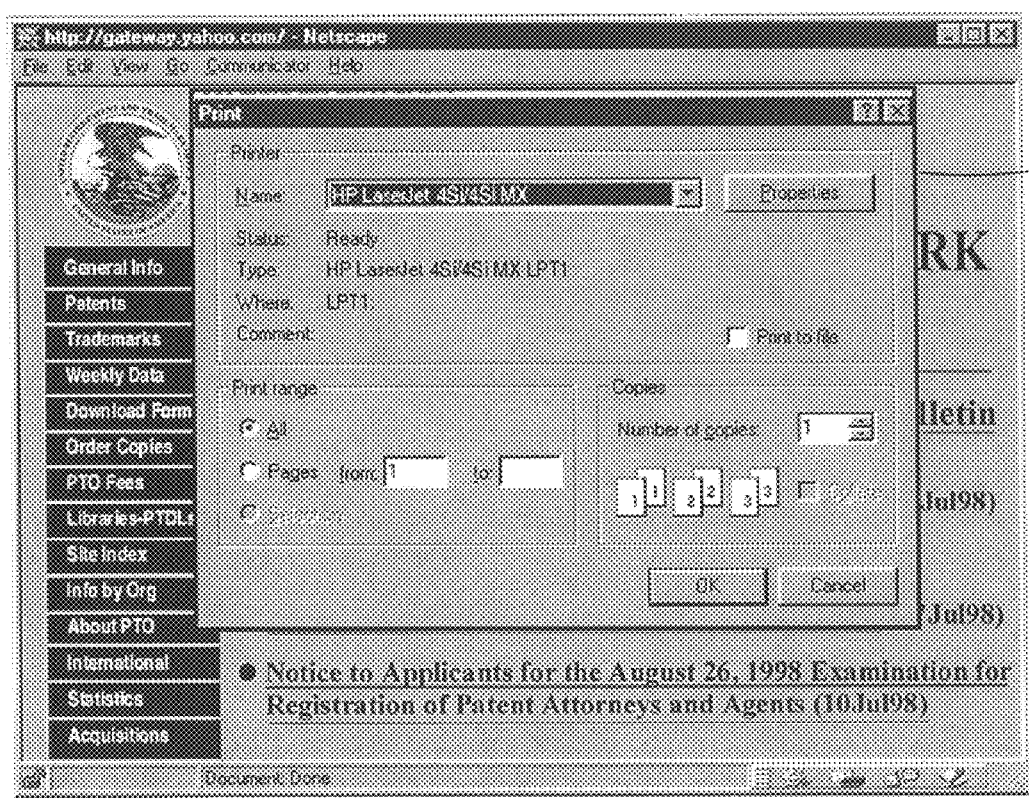
FIG. 3 is an example of operating system status box for a print dialog box that appears when requesting a HTML-compatible browser to print a screen.
Figure 4:
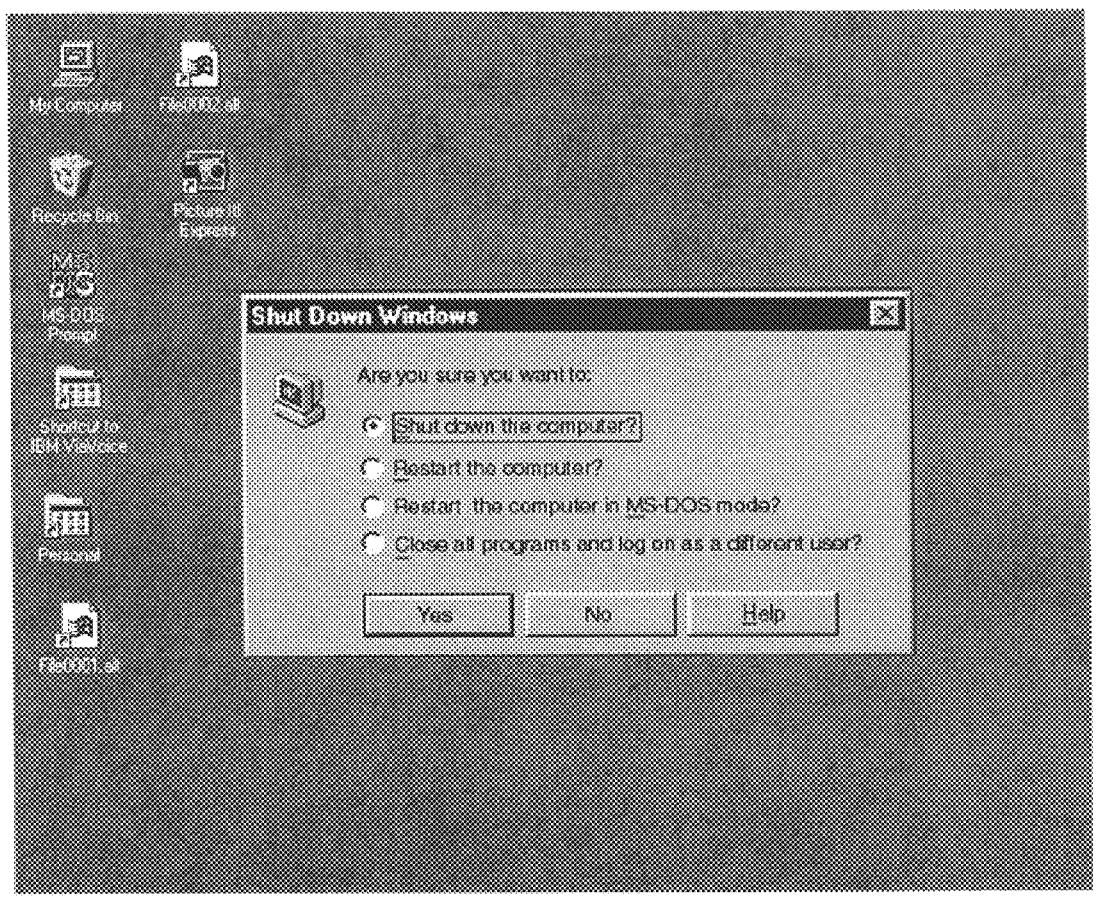
FIG. 4 is an example of an operating system response to depressing Ctrl-Alt-Del keys.
Figure 5:
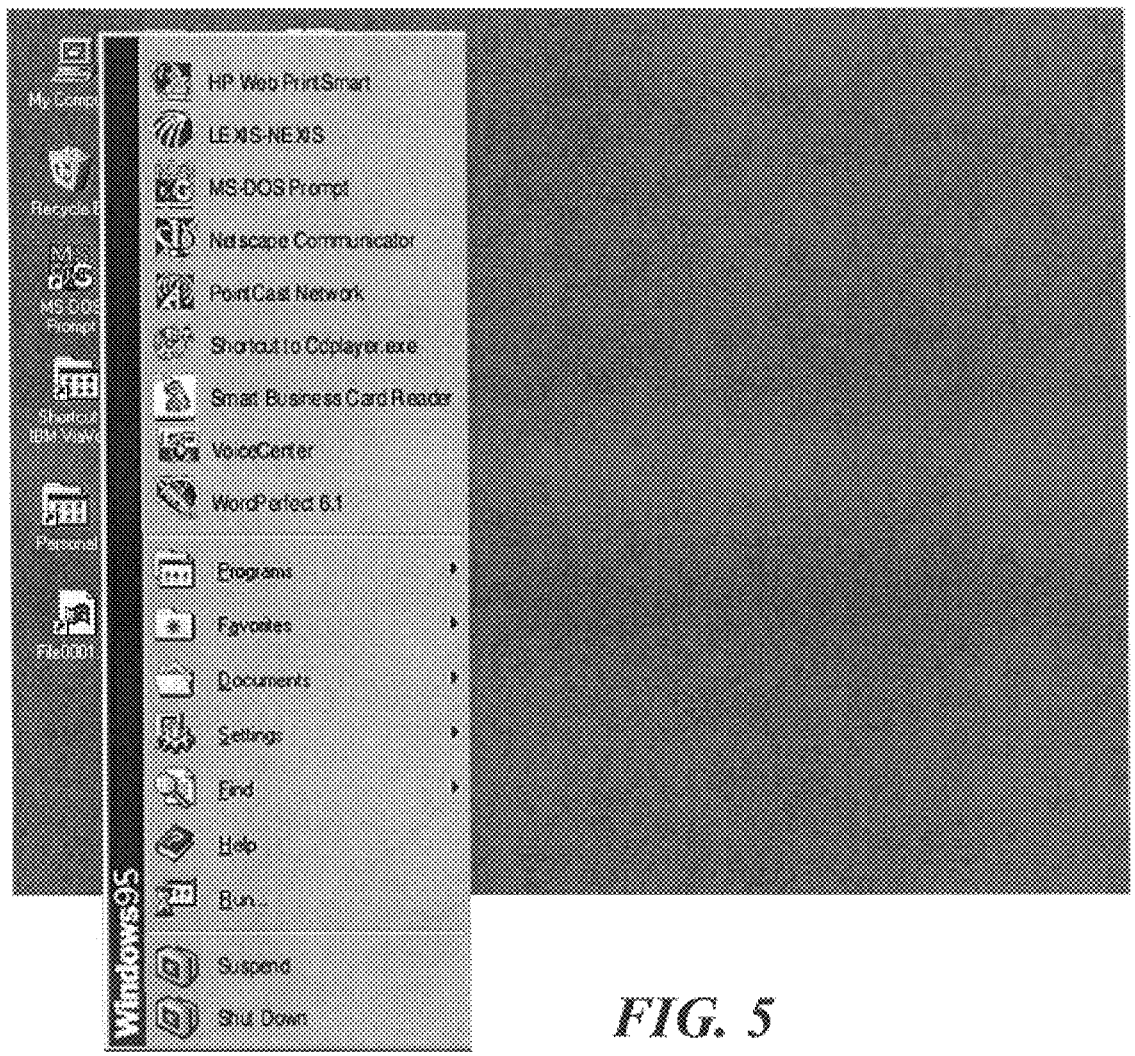
FIG. 5 is an example of an operating system response to depressing Ctrl-Esc keys.

If the print confirmation flag is set, step 907, the application 705 waits for a print confirmation message, step 908. The print confirmation messages are intercepted. An example print confirmation box for a print confirmation message is illustrated in FIG. 3. Once a print confirmation message is intercepted, the print confirmation box is shifted either up or down, left or right, outside the viewable area of the screen. The purpose of this shifting is to eliminate the viewing of this box by a kiosk end-user and not to distract from the current window being viewed. After intercepting the print confirmation message, a confirmation, usually "OK" or "Yes" is sent to the target window, step 900. Here the target window is the print confirmation box of FIG. 3. The confirmation sent causes the print confirmation box to behave as if an end-user had selected the "OK" or "Yes" button using a mouse and keyboard. The application 705 returns and waits for the next print confirmation message.

If the crash or error detect flag is set, step 910, the application waits for an operating system error message box, step 911. After intercepting the error message box, a reboot message is sent to the operating system, step 912. In an alternate embodiment, a message could be sent directly to the BIOS 702 or hardware 701. An example error message box is illustrated in FIG. 10. The application can optionally post a message to the end-user that the system is rebooting, step 913. The application 705 returns and waits for the next error message box.

In another embodiment, the application 705 contains a timer that triggers the application to query the operating system for a known response. First a timer is loaded with a predetermined time interval, step 914. Next a query is sent to the operating system 704, such as get the system date and time, step 915. This is sometimes known as a watchdog timer because the application 705 watches for a predetermined event to occur within a selected time interval. If the event does not occur, such an operating system response to a query, the timer times out and begins to re-initialize the system, step 915. This enables the watchdog timer to "keeps an eye on' or "watch" the system by always needing to be reset within its watch interval or expire and cause the system to reboot. Methods of creating watchdog timers are known. In this embodiment, it is also possible to use timers in hardware 701, such as a TI 555 timer and logic in a BIOS 702 and device driver 703 that reset the system by re-booting. An example hardware interrupt is the Advance Power Management set of APIs (Application Program Interfaces) from Microsoft. Once the operating system re-boots, the application 705 begins waiting for an error box, step 911 and sets the watchdog timer, step 914.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A method in a daemon process to intercept operating system messages in an informational processing device comprising the steps of:

executing a daemon process running in a background of a multitasking operating system, wherein a parameter flag for a print confirmation message is initialized into the daemon process at startup using at least one of an initialization file and a defined default parameter setting, the daemon process comprising the sub-steps of:

waiting for an operating system message;

determining if the message corresponds to a previously selected operating system message wherein the operating system message is the print confirmation message;

wherein if the message is the print confirmation message and the parameter flag for the print confirmation message is set, then the daemon process intercepts the print confirmation message from being displayed on an user interface; and wherein if the message is the print confirmation message and the parameter flag for the print confirmation message is not set then the daemon process will not intercept the print confirmation message to be displayed on the user interface.

2. The method of claim 1, further comprising the step of:

moving the print confirmation box outside the viewable area of the display.

3. The method of claim 1, wherein the step of determining if the system message corresponds to a previously selected operating system message wherein the operating system message is an error message.

4. The method of claim 1, wherein the step of performing an operating system call comprises calling a function that passes a confirmation message to the operating system.

5. The method of claim 1, wherein the step of performing an operating system call comprises calling a function that passes a reboot message to the information processing device.

6. The method of claim 1, wherein the step of performing an operating system call comprises the sub-steps of:

setting a timer to a predetermine time interval;

sending a message to the operating system; and waiting to the predetermined time interval and if a message is not received, selecting an interrupt to reset the information processing device.

7. A computer readable medium containing programming instructions in a daemon process for intercepting an operating system messages in an informational processing device, the program instructions comprising instructions for:

executing a daemon process running in a background of a multitasking operating system, wherein a parameter flag for an operating system message is initialized into the daemon process at startup using at least one of an initialization file and a defined default parameter setting, the daemon process comprising the programming instructions:

waiting for an operating system message;

determining if the message corresponds to a previously selected operating system message wherein the operating system message is a keyboard message; and performing an operating system call that has been previously mapped to the selected operating system message:

wherein if the message is the keyboard message and the parameter flag for the keyboard message is set, then the daemon process intercepts the keyboard message from being passed to an application and an operating system; and wherein if the message is the keyboard message and the parameter flag for the keyboard message is not set then the daemon process will not intercept the keyboard message from being passed to the application and the operating system.

8. The computer readable medium of claim 7, wherein the step of determining if the system message corresponds to a previously selected operating system message wherein the operating system message is a mouse message.

9. The computer readable medium of claim 7 or claim 8, wherein the step of performing an operating system call comprises calling a function that does not pass the operating system message.

10. The computer readable medium of claim 7, wherein the step of determining if the system message corresponds to a previously selected operating system message wherein the operating system message is a print confirmation message.

11. The computer readable medium of claim 10, further comprising the step of moving the print confirmation box outside the viewable area of the display.

12. The computer readable medium of claim 7, wherein the step of determining if the system message corresponds to a previously selected operating system message wherein the operating system message is an error message.

13. The computer readable medium of claim 7, wherein the step of performing an operating system call comprises calling a function that passes a confirmation message to the operating system.

14. The computer readable medium of claim 7, wherein the step of performing an operating system call comprises calling a function that passes a reboot message to the information processing device.

15. The computer readable medium of claim 7, wherein the step of performing an operating system call comprises the sub-steps of:

setting a timer to a predetermine time interval;

sending a message to the operating system; and waiting to the predetermined time interval and if a message is not received, selecting an interrupt to reset the information processing device.

16. An informational processing device comprising:

a daemon process executing in a background of a multi-tasking operating system, wherein a parameter flag for an operating system message is initialized into the daemon process at startup using at least one of an initialization file and a defined default parameter setting, that provides:

means for waiting for an operating system message;

means for determining if the message corresponds to a previously selected operating system message wherein the operating system message is a keyboard message; and means for performing an operating system call that has been previously mapped to the selected operating system message;

wherein if the message is the keyboard message and the parameter flag for the keyboard message is set, then the daemon process intercepts the keyboard message from being passed to an application and an operating system; and wherein if the message is the keyboard message and the parameter flag for the keyboard message is not set then the daemon process will not intercept the keyboard message from being passed to the application and the operating system.

17. The informational processing device of claim 16, wherein the means for determining if the system message corresponds to a previously selected operating system message wherein the operating system message is a mouse message.

18. The informational processing device of claim 16, wherein the means for performing an operating system call comprises calling a function that does not pass the operating system message.

19. The informational processing device of claim 16, wherein the means for determining if the system message corresponds to a previously selected operating system message wherein the operating system message is a print confirmation message.

20. The informational processing device of claim 16, wherein the means for moving the print confirmation box outside the viewable area of the display.

21. The informational processing device of claim 16, wherein the means for determining if the system message corresponds to a previously selected operating system message wherein the operating system message is an error message.

22. The informational processing device of claim 16, wherein the means for performing an operating system call comprises calling a function that passes a confirmation message to the operating system.

23. The informational processing device of claim 16, wherein the means for performing an operating system call comprises calling a function that passes a reboot message to the information processing device.

24. The informational processing device of claim 16, wherein the means for performing an operating system call comprises:

means for setting a timer to a predetermine time interval;

means for sending a message to the operating system; and means for waiting to the predetermined time interval and if a message is not received, selecting an interrupt to reset the information processing device.

* * * * *